(12) United States Patent
Hale

(10) Patent No.: X4120
(45) Date of Patent: May 20, 1825

(54) STEAM ENGINE, ROTARY

(76) Inventor: Elisha Hale

Elisha [illegible]

Letters Patent

The Schedule referred to in these Letters Patent and making part of the same containing
a description in the words of the said Elisha [illegible] himself of his improvement in
the rotary Machine which with little variation [illegible] [illegible] [illegible] [illegible]
[illegible] Steam Engine, Fire Engine, [illegible] [illegible] [illegible] [illegible] a [illegible]
[illegible] [illegible] [illegible] [illegible] all of which applications it operates on the rotary principle which [illegible]
ciple as applying to the Steam Engine, Fire Engine, [illegible] and suction [illegible]
Bellows and Ventilator together with all the appurtenances of the Machine and
at [illegible] [illegible] with that of a [illegible] [illegible] which together with a [illegible] [illegible]
[illegible] Water or [illegible] Wheel for Steam Boat and Steam [illegible] [illegible] [illegible]
[illegible] [illegible] [illegible] [illegible] Wind Mill Wheel, [illegible] [illegible] [illegible] [illegible]
connecting Cog to attach the shaft of the above mentioned Steam Engine [illegible]
and [illegible] Steam Boat and [illegible] to the shaft of a Water or [illegible] Wheel.

The above mentioned Machine or [illegible] consists of a Machine [illegible]
of Metal or [illegible] as follows viz. A Box is made in two equal parts of a [illegible]
circular form meeting closely in the Center, on the edge of each part [illegible] [illegible]
more lips of [illegible] suitable to receive a bolt and having holes in them to receive bolts
by which they are fastened together. The thickness of the two parts bolted together is
about equal to one [illegible] the diameter of the Circumference.

The outer part of the box as far as from the edge on both sides is
one [illegible] part of the diameter of the circumference [illegible] [illegible] [illegible] [illegible]
placed together, about equal to one [illegible] part of the diameter of the Circumference
[illegible] [illegible] of each part of the box is formed a [illegible] [illegible] [illegible] [illegible] the
[illegible] of the wheel to [illegible] in. In the box at the outer line of the cavity is a channel
[illegible] made in each side commencing at an aperture in the edge of the box and
running in a circular course [illegible] [illegible] of the distance around the box [illegible] [illegible]
out and terminating in a round or square hole as may be convenient. The chan
nel also may be either a [illegible] square or round form and the [illegible]
[illegible] [illegible] [illegible] [illegible] [illegible] is [illegible] as being most convenient. By [illegible] to

[illegible] number of valves in the wheel so that two may be in operation at a time, as is the
case with this machine on the foregoing plan though not indispensable the necessary
[illegible] water channel &c. may be dispensed at any point round the box after performing
its evolution on the wheel or the wheel its operation on that, [illegible] the channel around
the axle of one entire cavity being formed in each partition plate of the box. [illegible]
in depth and width about equal to five sixteenths [illegible] of the outer edge of the box
[illegible] [illegible] are united, but may be varied to suit the particular application of the ma-
chine for, [illegible] a [illegible] or [illegible] wheel, where [illegible] [illegible] water is low and
[illegible] [illegible] should be much larger and the box and channel proportionate to
same. [illegible] of the channel must be made standing on a slope to conform to
the [illegible] of the valves so that they will turn around in it the outer end being made
to conform to the periphery of the wheel. At the outside of the channel is a groove half
[illegible] in each plate of the box [illegible] depth and width about equal to one fifth of the depth
of the channel, [illegible] to receive the periphery of the wheel, and the edge of
[illegible] [illegible] of the channel must be [illegible] [illegible] [illegible] with the
groove and a [illegible] groove made in the edge of each plate to receive a wire or [illegible]
to prevent leakage.

[illegible] wheel of such diameter and thickness as will
[illegible] fit the groove and [illegible] the [illegible] of the portion inside of the channel
and on each side of the rim a [illegible] quite round its circumference [illegible]
in depth and thickness of the rim, which [illegible] set close to the inside of the
[illegible] [illegible] which [illegible] is about as thick as the diameter of the
[illegible] of the rim of the wheel. In the rim are three or more apertures for the valves
[illegible] [illegible] and conforming to the channel under the same [illegible] [illegible]
and [illegible] [illegible] a valve fitting the aperture and of the thickness of the rim and
[illegible] the centre of the valve a [illegible] [illegible] [illegible] the rim to a point exactly in the
centre [illegible] [illegible] the wheel [illegible] [illegible] the valves are [illegible] [illegible] by [illegible]
[illegible] [illegible] [illegible] [illegible] [illegible] [illegible] each other
at right angles [illegible] [illegible] the rim each in length about equal to the distance
between the [illegible] the box and the [illegible] [illegible] more than equal to that of [illegible]
[illegible] the wheel, which are [illegible] [illegible] to [illegible] [illegible] the arms on the
[illegible] [illegible] to turn between them. The [illegible] of the valves [illegible] [illegible] [illegible]
rim of the wheel should be made to conform to its circle and that of the [illegible]

which are fastened to the centre cavity of the box directly under the arms of the [illegible] shaft and secured to the main plates of the box, When the wheel is [illegible] immediately the bars must be of such width as exactly to suit the [illegible] the [illegible] and they are placed in a line parallel with the rim of the wheel. The [illegible] [illegible] Bar commences at the point opposite the centre of the [illegible] [illegible] [illegible] and continues round in circle to about the centre of the [illegible] [illegible] clash off the water &c. being nearly five eighths of the distance around the circle, the short hanging Bar is placed a little nearer the center of the box directly under the inside of the arm giving the space left by the other, and each end [illegible] of the ends of the long one about the width of the bar at the ends; each has to [illegible] bended in a shape corresponding with the length of the lateral arm and forming a quarter of a circle terminating at a point next to the plates of the box to which they are secured each of the ends being turned in a little more than to make them conform to the circle at large and so as exactly to meet the end of the arm when pointing to the plate of the box.

[illegible] channel between the apertures, or the entrance of the water &c and that which conducts it off is filled with a block, that at [illegible] even with the edge of the partition each end, forming a gentle [illegible] to turn the water stream &c. without a break, having between the two blocks only room for that part of the rim of the wheel which contains the valves to [illegible] the valves are placed [illegible] flat in the rim of the wheel, in the centre of the [illegible] may be placed a weak spring or two rollers to set close to the rim exactly, [illegible] to the [illegible] of the wheel, so that no water &c. will pass

[illegible] axle is square in the centre of the box and its shoulders rest against each plate of it, or it may be made round in the box with wings on the sides and the wheel be either closely attached or left a little loose, so that as it turns the wheel will turn a little to [illegible] [illegible] The ends of the axle without the box may be square or flat to suit the machinery to which they are to be attached. The wheel [illegible] [illegible] placed in the box and the box bolted or screwed together the steam or water is introduced [illegible] [illegible] [illegible] round the wheel [illegible] alternately one valve and after another against the ends of the hanging bars which turns the valves flat in the rim of the wheel as they pass between the two blocks in the channel and by and [illegible] arm

United States Patent

Patent No.: X4120

United States Patent

Patent No.: X4120

[illegible]

[illegible]

[illegible]

[illegible] by [illegible] wheels of suitable size should be applied or attached to the head
of the pump shaft and another to the vertical shaft to which the [illegible] are placed
[illegible] working horizontally. The quantity of water thrown off in a
minute will be proportionate to the size of the pump channel [illegible]
[illegible] applied. Either of the last named modes of operation will be
[illegible] in raising water from Canals, Mines, ships, wells &c.
The foregoing machine when used for a Ventilator
[illegible] and [illegible] of any kind in mines, wells, [illegible] houses &c. may be made
with one or more valves and two partitions in the Channel, or the air dividing the
channel [illegible] at each end of which there must be an aperture for the
air to enter and pass up [illegible] connected pipes so that there will be by the operation
of one wheel with [illegible] valves on it revolving alternately in each
channel produced two distinct separate currents [illegible] by suction from
[illegible] forcing [illegible] fresh air [illegible] down into the ship, mines &c
or by omitting the second partition one current only may be produced by
suction [illegible].
The pump or Ventilator may be operated upon by an desired
power being applied to the shaft or by having the partitions in the Channel as
above set forth. [illegible] water or air may be applied as an operating power
[illegible] side of the wheel passing in one of those Channels while the other side
or part of the wheel with its valves operates either by suction or forcing and
produces a current of air either up or down according to the situation and
manner of applying it. Or by the same mode of operation the Channel
being divided into two separate ones, both sides of the wheel will operate at
the same time, [illegible] by [illegible] at the outlet the two apertures, the
air water &c will pass off in one pipe. In the same manner the operation may
be applied in suction.
The machine as just described, may be used as a bellows for
any purpose, where a pressure of air is wanted and a regular current required. It
may be made of timber or metal and may be in size to suit the application and
may be placed in any desired position. By adding a second partition in the Chan
nel to divide it into two equal parts and adding to the number of valves so that
there shall be [illegible] in the wheel and two more apertures in the box at the side opposite those first named the separate currents of air [illegible] each other which
is produced by passing out at opposite points. The edge of the buckets should be [illegible]
with leather or other elastic substance and should be larger in proportion to the
diameter than is here laid down in a description of the wheel.

This machine to be used for a water wheel may be made
either of timber or metal and placed either vertically or horizontally and then
stationed the water must be conducted to it in a tube of suitable size [illegible]
water after operating on the wheel may be continued on in a connected tube
and passed through two or more wheels if the fall be sufficient. The [illegible]
to the water should be [illegible] provided with a [illegible] or other means to keep off the
[illegible] [illegible] [illegible] the [illegible] of water at the [illegible]
which may be placed in the conductor [illegible]

Salem April 15 1823

Witnesses

[illegible]
Eliza H Hale
[illegible] Crane
Wm H Hayman
Kendrick [illegible]

Elisha Hale

1783 [illegible]

Exd
W.G.

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ................ *189*...

*SIR:*

*The printed* ........ copies ........ *of Patent No.* E Hale

........ are ........ *exhausted.*

May 20 1825

*As soon as printed a copy will be mailed you to complete your order.*

*By direction of the Commissioner:*

*Very respectfully,*

*Chief Clerk.*

81431-6-97-5m